July 20, 1926.
C. L. SMITH
LISTER
Filed Feb. 25, 1926 2 Sheets-Sheet 2
1,593,475
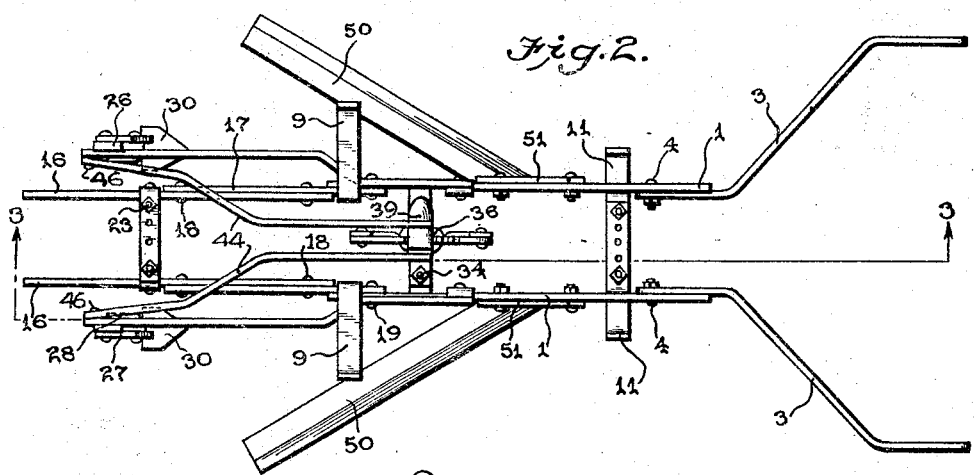
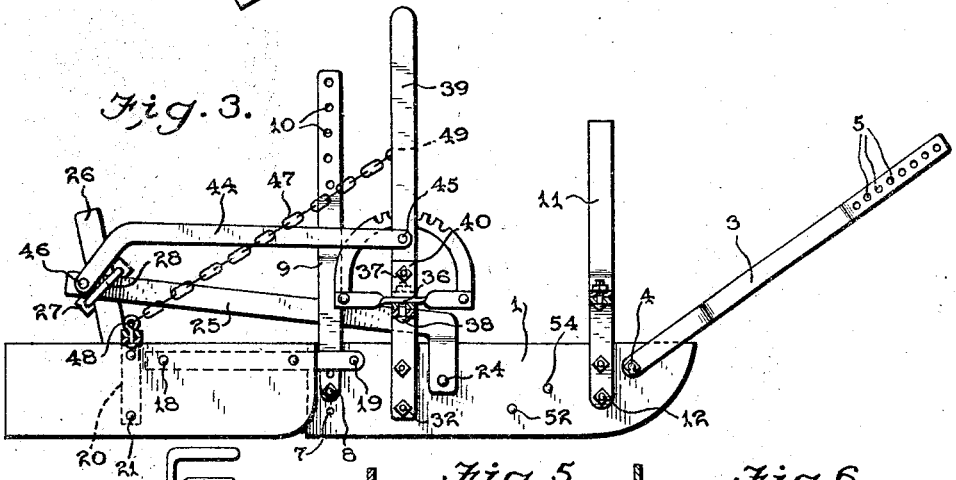
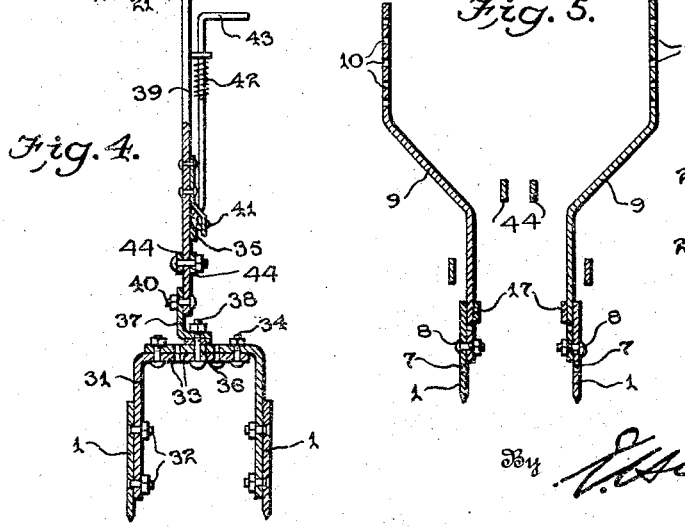
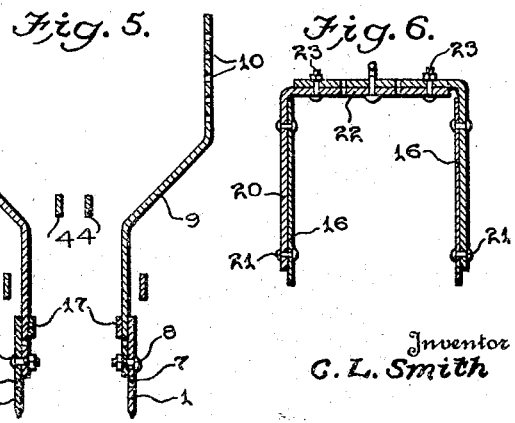
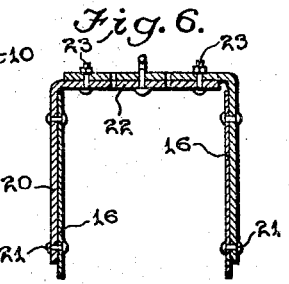

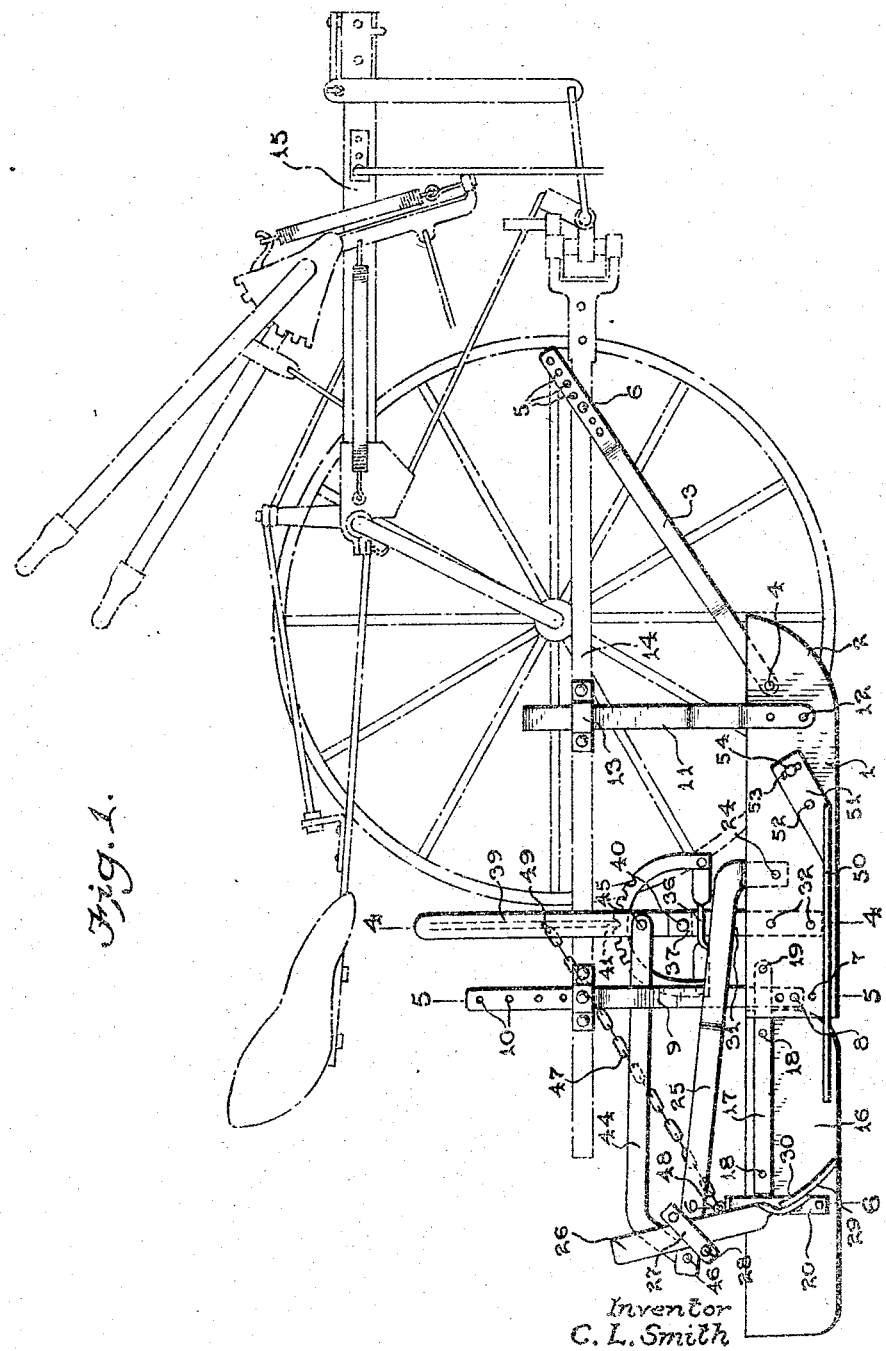

Patented July 20, 1926.

1,593,475

UNITED STATES PATENT OFFICE.

CHARLIE L. SMITH, OF CHILDRESS, TEXAS.

LISTER.

Application filed February 25, 1926. Serial No. 90,579.

It is a purpose of the present invention to provide, in a lister for use in connection with cultivating machines and drawn thereby and adapted for disposition in straddling relation to a row of plants, essential improvements on the structure of lister set forth, illustrated and claimed in Letters Patent issued to Charlie L. Smith and Harvey B. Handley, August 18, 1925, No. 1,550,586.

One of the improvements consists in an essential change in the method of attaching small rear beams used for supporting a shovel on each side of a fender at the rear of the runners of the listers, there being means so supporting the small rear beams at the rear of the runners of the lister with additional means whereby the shovels may be conveniently raised and lowered at any time during the operation of the lister in conjunction with a cultivator.

Still another purpose is to provide means in the raising and lowering means for the shovels for supporting the shovels in different raised positions.

A further purpose is to provide means for raising and lowering the fenders at the same time as the shovels are raised, the fenders being supported in different raised positions.

As in Letters Patent No. 1,550,586, the present invention also includes knife blades attached to the outer faces of the runners, there being means to adjust the knife blades angularly with respect to the surface of the soil in order to increase or decrease their cutting depth.

In this improved lister, the shovels are permitted to be raised and lowered by the operator of the cultivator (to which the entire lister is attached) without leaving the seat of the cultivator and without raising the runners with their knives and thereby acting to throw more or less dirt about the plants in the rows while at the same time leaving the runners and the knives in fixed position for the purpose of cutting weeds and stirring the soil between the rows.

The invention comprises further features and combinations of parts to be hereinafter set forth, shown in the drawings and claimed.

In the drawings:

Figure 1 is a view in side elevation showing a cultivator in dot and dash lines with the improved lister applied.

Figure 2 is a plan view of the lister with the cultivator omitted.

Figure 3 is a central longitudinal sectional view on line 3—3 of Figure 2.

Figure 4 is a vertical sectional view on line 4—4 of Figure 1, more clearly showing the relative construction of the runners and the raising and lowering means for the fenders and the shovels.

Figure 5 is a vertical sectional view on line 5—5 of Figure 1.

Figure 6 is a sectional view on line 6—6 of Figure 1.

Referring to the drawings, 1 designates opposed parallel runners, their general construction and shape being similar to those in Letters Patent No. 1,550,586, above mentioned, with the exception, however, that the forward edges are curved downwardly and rearwardly and provided with laterally disposed cutting blades 2. Attached to the forward portions of the runners are bars or rods 3, their attachment being pivotal, as at 4, and their forward upper ends having a plurality of openings or apertures 5 by any opposite two of which bolts 6 may be used for attaching the bars or rods to the frame of a conventional type of cultivator, as shown in Figure 1.

The rear portions of the runners have extra holes or apertures 7, any opposite two of which may receive bolts 8 for attachment of the bars or rods 9. These bars or rods 9 have apertures or openings 10 adjacent their upper ends through the medium of which suitable bolts may pass through any opposite two of said openings for attachment of these bars to the frame of the cultivator, as shown in Figure 1.

Bars or rods 11 are pivotally attached at 12 to the forward portions of the runners and their upper ends engage through arched plates or straps 13 which are carried by the beams 14 of the cultivator 15 shown in dot and dash lines, thereby further attaching the runners to the cultivator.

To correspond somewhat with the arrangement and construction as in Letters Patent No. 1,550,586, the present improvement also includes fenders 16 which are disposed at the rear of the runners in the relation as shown in Figures 1 and 2. These fenders have bars 17 attached thereto, as at 18, and the forward ends of the bars are pivotally connected, as at 19, to the runners.

In order that the fenders may be raised and lowered in unison and to hold them in parallelism when raised or lowered or in one position or another, angle straps 20 are secured at 21 to the outer faces of the fenders. As previously stated, the straps 20 are angular, therefore their horizontal portions 22 are bolted together, as at 23, thereby providing an arch and, due to the straps being connected to the fenders, the fenders may be held in parallel position and may be raised and lowered in unison, as the bars 17 are pivotally connected at 19 to the runners.

Also pivotally attached to the runners, as at 24, are right angle ends of bars 25 which extend rearwardly and slightly upwardly and which have attached at their rear ends short shovel beams 26. In fact, arching straps 27 engage over the beams, there being U-bolts 28 straddling the bars 25 with their ends passing through the straps 27 to clamp the beams 26 in position. The beams 26 are angularly arranged, that is, they extend downwardly and forwardly, and their lower portions are twisted, with the extremities beyond the twists curved.

Suitable shovels 29 are attached at 30 to the curved extremities of the beams 26 and are disposed especially for the purpose of stirring the soil between the rows of plants.

Suitable angular straps 31 are secured rigidly at 32 to the runners. These straps are similar in construction and function to the straps 20 with the exception that they are a trifle thicker, and their upper right angularly extending horizontal portions 33 are secured together, as at 34, thereby acting to maintain the runners in relative parallelism, especially rigidly in parallelism during the operation of the lister in conjunction with the cultivator.

An arcuate rack or quadrant 35 constructed from a single bar of metal has its twisted attaching base 36 secured to the arch formed by the lateral horizontal portions of the straps 31. A lever support 37 is attached at the same point where the attaching base of the rack or quadrant is secured by a bolt 38 to the lateral portions of the straps 31. A lever 39 is pivoted at 40 to the lever support and has a dog 41, which is spring tensioned as at 42, for engagement with any one of the teeth of the rack or quadrant to hold the lever in different positions. The dog is actuated by a handle 43 to disengage it from the teeth of the rack, so that the lever may be adjusted. Links 44 are pivotally connected at 45 to the lever and in turn pivoted at 46 to the rear ends of the bars or rods 25, making it possible by moving the lever to raise or lower the bars or rods 25 and with them the beams 26 and the shovels 29.

As previously stated, it is the purpose to raise and lower the fenders at the same time that the shovels are raised or lowered, therefore a chain 47 is attached at 48 to the arched portions of the straps 20, and in turn connected at 49 to the lever. Obviously, when moving the lever, the chain is drawn taut and the fenders are moved on their pivots 19 simultaneously with the raising and lowering of the shovels.

Suitable knife blades 50 are provided and in order that they may extend laterally and rearwardly divergently from the runners, the knife blades have forwardly and laterally positioned extensions 51. Suitable bolts or other fastenings 52 pivotally connect the extensions 51 to the sides of the runners. The extensions 51 near their extremities have slots 53 which are arcuately formed, using the bolts 52 as their centers. Suitable bolts 54 pass through the slots and through openings of the runners to additionally attach the knife blades to the runners and due to the provision of the arcuate slots, the knife blades may be adjusted in different angular positions with respect to the surface of the soil, that is, to increase or decrease the depth of their cutting action.

The invention having been set forth, what is claimed is:

1. In an attachment for single or double row riding cultivators, the combination with beams carried by the cultivator, of runners adapted for operating in the furrows beside a row of plants, means depending from the beams for rigidly suspending the runners, means attached to the forward ends of the beams and extending rearwardly and downwardly and in turn connected to the forward ends of the runners to relieve rearward strain upon the suspension means, fenders at the rear of the runners and in alignment therewith and pivotally supported thereon, bars pivotally supported on the runners and extending rearwardly and carrying shovels at their rear ends, and means operatively and pivotally supported upon the runners and having operative connections with the fenders and the shovel supporting bars for raising the fenders and the shovels simultaneously.

2. In an attachment for a single or a double row riding cultivator, the combination with beams carried by the cultivator, of runners operatively supported upon the beams and including means for relieving rearward strain on the runner supporting means, fenders at the rear of the runners and pivotally supported on the runners, bars pivotally supported upon the runners, shovels adjustably supported on the rear ends of the bars, and an operative lever pivotally mounted upon the runners and having operative connections with the bars for raising and lowering them, thereby raising and lowering the shovels.

3. The combination with the structure in claim 2, of means operatively connecting the lever and the fenders whereby as the lever is moved for raising and lowering the shovels, the fenders may raise and lower simultaneously therewith.

4. In an attachment for a single or double row riding cultivator, the combination with beams carried by the cultivator, of runners operatively supported upon the beams, a pair of bars pivoted on the rear ends of the runners and carrying parallel fenders, an arch connecting the fenders and holding them rigidly, bars pivoted on the runners and extending rearwardly, beams adjustably carried by the rear ends of the bars and carrying shovels at their lower ends, an operating lever pivotally supported on the runners and having links pivotally connected to the rear ends of the bars for raising and lowering the shovels, and a chain connected to the arch of the fenders and in turn operatively connected to the lever, whereby as the shovels are raised, the fenders simultaneously raise.

In testimony whereof he affixes his signature.

CHARLIE L. SMITH.